US008660423B2

United States Patent
Vandewege et al.

(10) Patent No.: US 8,660,423 B2
(45) Date of Patent: Feb. 25, 2014

(54) CIRCUIT, SYSTEM AND METHOD FOR MONITORING AN OPTICAL FIBER NETWORK

(75) Inventors: Jan Vandewege, Mariakerke (BE); Bert De Mulder, Heusden (BE); Wei Chen, Ghent (BE); Xing Zhi Qui, Wondelgem (BE)

(73) Assignees: IMEC, Leuven (BE); Universiteit Gent (University Ghent), Ghent (BE)

( * ) Notice: Subject to any disclaimer, the term of this patent is extended or adjusted under 35 U.S.C. 154(b) by 1193 days.

(21) Appl. No.: 11/538,667

(22) Filed: Oct. 4, 2006

(65) Prior Publication Data

US 2007/0122157 A1 May 31, 2007

Related U.S. Application Data

(60) Provisional application No. 60/724,676, filed on Oct. 7, 2005.

(30) Foreign Application Priority Data

Mar. 30, 2006 (EP) .................................. 06447043

(51) Int. Cl.
*H04B 10/08* (2011.01)
*H04B 17/00* (2006.01)

(52) U.S. Cl.
USPC ................... 398/21; 398/9; 398/16; 398/17

(58) Field of Classification Search
USPC .............. 398/21, 9, 10, 16, 17, 20; 356/73.1; 9/21
See application file for complete search history.

(56) References Cited

U.S. PATENT DOCUMENTS

| 6,549,310 B1 | 4/2003 | Kuchta et al. ................ 359/110 |
| 7,218,388 B1 * | 5/2007 | Keeler et al. ................ 356/73.1 |
| 7,236,238 B1 * | 6/2007 | Durresi et al. .............. 356/73.1 |

(Continued)

FOREIGN PATENT DOCUMENTS

| EP | 1 524 781 A1 | 4/2005 | ............ H04B 10/08 |
| EP | 1 624 593 A1 | 2/2006 | ............ H04B 10/08 |
| EP | 1753159 A1 | 2/2007 | |
| WO | 2004079404 A2 | 9/2004 | |

OTHER PUBLICATIONS

G. Biain, et al., "New Technique for Nonintrusive OTDR Based on Traffic Data Correlation", Aug. 18, 1994, Electronics Letters, vol. 30, No. 17, pp. 1443-1444.*
European Search Report for 0644704.8-2415 dated Aug. 30, 2006.

(Continued)

*Primary Examiner* — Daniel Dobson
(74) *Attorney, Agent, or Firm* — McDonnell Boehnen Hulbert & Berghoff LLP

(57) ABSTRACT

The present invention is related to a front-end circuit for an optical communication system including a laser module arranged for transmitting bursts of data signals over an optical network and a driving circuit for providing the bursts of data signals to the laser module. The front-end circuit further includes receiver means in connection with said laser module and arranged for receiving from the optical network optical echo signals. The laser module includes a laser diode arranged for transmitting the bursts of data signals. The driving circuit is arranged for setting a disabling signal for stopping the laser diode from transmitting bursts of the data signals. Fiber-related information can be extracted from the echo signals, such as distance-resolved optical fiber reflections and fiber attenuation.

25 Claims, 5 Drawing Sheets

(56) References Cited

U.S. PATENT DOCUMENTS

| | | | |
|---|---|---|---|
| 2003/0113118 A1* | 6/2003 | Bartur | 398/139 |
| 2004/0247316 A1* | 12/2004 | Soto et al. | 398/47 |
| 2005/0123293 A1* | 6/2005 | Maki et al. | 398/12 |
| 2005/0201761 A1* | 9/2005 | Bartur et al. | 398/197 |
| 2006/0050265 A1* | 3/2006 | Schmuck et al. | 356/73.1 |
| 2006/0092404 A1* | 5/2006 | Weller | 356/73.1 |
| 2007/0036545 A1* | 2/2007 | Lautenschlager | 398/33 |
| 2008/0137540 A1* | 6/2008 | Botvich | 370/241 |

OTHER PUBLICATIONS

Biain et al., "New Technique for Nonintrusive OTDR Based on Traffic Data Correlation," Electronics Letters Aug. 18, 1994, vol. 30, No. 17, pp. 1443-1444.

Iannone et al., "The Effect of Reflected and Backscattered Live Traffic on CWDM OTDR Measurements," IEEE Photonics Technology Letters, vol. 16, No. 17, Jul. 2004.

Extended European Search Report in EP 06121540.6 (Feb. 5, 2008).

\* cited by examiner

CIRCUIT, SYSTEM AND METHOD FOR MONITORING AN OPTICAL FIBER NETWORK

RELATED APPLICATIONS

The present patent application claims priority under 35 U.S.C. §119(e) to U.S. Provisional Patent Application Ser. No. 60/724,676, which was filed Oct. 7, 2005. The present application further claims priority under 35 U.S.C §119(b) to EP 06447043.8, which was filed Mar. 30, 2006. The full disclosures of U.S. Provisional Patent Application Ser. No. 60/724,676 and EP 06447043.8 are incorporated herein by reference.

FIELD

The present invention relates to the field of optical fiber network monitoring. More specifically it relates to a circuit, system and method for non-intrusive, passive monitoring.

BACKGROUND

Today optical fibers are the preferred channel for the transmission of information with large bandwidth, whether that is audio, video, data or others. Compared to copper-based twisted pair or coax networks, optical fibers have a much higher bandwidth, much smaller attenuation per unit of length and less susceptibility to electromagnetic interference. As optical fiber networks grow more complex and expand into the access network, it becomes important to monitor the network performance. Existing solutions examine the performance of specific network services during network operation, mainly relying on bit error rate (BER) measurements, but the possibility to monitor the physical layer is not as widespread because of hitherto high implementation and operation costs. Nevertheless, a fast preventative and continuous diagnosis of the integrity of the fiber network and a quick identification of deteriorating link performance can be an important asset in all kinds of performance-critical optical fiber links and networks.

A system that allows round-the-clock monitoring of the fiber network status and provides knowledge of the fiber integrity can also be a strong driving force behind full-scale deployment of passive optical fiber access networks. In order to characterize the channel response of a passive optical access network compliant with BPON (ITU-T G.983.1), GPON (ITU-T G.984.2), EPON (IEEE 802.3), or other standards, it is necessary to perform measurements from both the optical network unit (ONU) and the optical line termination (OLT) side. This is necessary because it is very difficult to detect and distinguish reflections from behind the optical splitter when only measuring from the OLT side.

Generally, optical time domain reflectometry (OTDR) is the preferred method for defining the exact cause of a localized link deterioration of an optical fiber. Problems can result from fiber breaks, splice losses, and distributed losses due to fiber ageing. Other causes are possible as well. An OTDR system excites the fiber with an optical pulse, whose width is a trade-off between the distance resolution and measurement sensitivity.

Commercial off-the-shelf OTDR instruments are already deployed to monitor fibers from long-haul networks, where all optical fibers at the cabinet are tested by the same instrument and routed to the fiber under test with expensive optical switches. This architecture enables sharing the expensive monitoring equipment at the expense of costly additional optical components. It is difficult to apply this expensive and complex strategy to optical access networks, especially if one wants to measure from the ONU side. Current OTDR equipment is widely used but not suited for embedded use because of the invasive procedure. It requires data transmission to be stopped, the optical fiber link to be opened in order to enable the injection of OTDR pulses into the fiber, the detection and processing of the echo signals, and finally the restoration of the optical link and re-establishment of the data traffic.

An embedded OTDR system must meet three major criteria. First, the measurements should interfere as little as possible with the data traffic being transmitted over the optical fiber. Various techniques have been proposed to reduce or avoid interference, all suffering from the drawback that separate OTDR signals must be transmitted. A second requirement for embedded OTDR modules is that the system cost be low. The community of network providers adopts only cost-effective solutions to monitor all sections of the millions of kilometer of fiber that are operative worldwide. This is especially critical for PON access networks, where an OTDR unit is needed inside every ONU. A third requirement is that the embedded OTDR module should not have a negative impact on the link performance. Techniques using a separate wavelength, an optical splitter/combiner or data modulation decrease the link budget.

In patent application EP-1524781-A1 and U.S. Patent Publication No. 2005/0201761 the laser driver and laser diode present for data communication in the fiber endpoint are reused. This is a good approach, as the measurement shows the attenuation in a function of distance at the communication wavelength. The OTDR curve is dependent on the excitation wavelength and cannot be measured accurately by using a separate OTDR wavelength. This system also significantly reduces cost because no dedicated OTDR laser and driver are needed. Based on the fact that upstream and downstream communication operate in a single fiber and at the same wavelength, U.S. Patent Publication No. 2005/0201761 reuses the data receiver to measure optical echoes. This limits its use to a semi-duplex communication channel and excludes PON applications.

This problem is solved in EP-1524781-A1 by using a dedicated receiver and one extra optical component, namely an optical coupler. However, the price of this solution is considerably higher, and the optical coupler decreases the link optical power budget with its loss. This method also requires network traffic to be halted temporarily and the transmission of specific OTDR signals.

A similar approach is found in document EP 1624593-A1, which relates to a method and system for monitoring a passive optical distribution network. In this approach, a monitoring signal is sent through an optical fiber link. Parts of the reflected monitoring signal are received. These parts are subsequently used for comparing signal losses of the link and for deciding whether a failure has occurred.

Document EP 1632766-A1 presents a method for reflectometric testing by detecting the optical echoes without need for additional optical components, making it less expensive and therefore more suitable to embedded monitoring. The system, however, is still intrusive because it requires measurement windows during which the data transmission is halted to perform reflectometric tests.

In "The effect of reflected and backscattered live traffic on CWDM OTDR measurements" (Iannone et al., IEEE PTL, vol. 16, no. 7, pp. 1697-1699, 2004) a traffic monitoring method is disclosed using another wavelength than upstream/downstream (often 1650 nm). While this is non-intrusive, the costs are increased. Further, measurements on different wavelength do not necessarily perfectly reflect the link quality.

In "New technique for non-intrusive OTDR based on traffic data correlation" (Electronic Letters, Vol. 30, no. 17, pp. 1443-1444, Aug. 18, 1994), Biain et al. disclose a method for non-intrusive optical TDR. Correlation of the transmitted traffic data with the backscatter of the transmitted data allows the power attenuation of the optical link to be measured.

There is a need for a fiber monitoring system that solves the above-mentioned drawbacks and that is suitable for low-cost integration into, for example, an optical transmitter or even into a laser driver chip. Such a system can be used in PON networks as well as in almost any optical fiber network, provided that sufficiently long "idle" time windows are present or can be allocated during which echo signals can be acquired.

SUMMARY

The present invention relates to a front-end circuit for an optical communication system. The circuit includes a laser module arranged for transmitting bursts of data signals over an optical fiber network and a driving circuit for providing the bursts of data signals to the laser module. The front-end circuit further includes a receiver means in connection with the laser module (e.g., via a wireless link or a physical wireline connection) and arranged for receiving from the optical fiber network optical echo signals. The laser module of the front-end circuit includes a laser diode arranged for transmitting bursts of data signals and the driving circuit is arranged for setting a disabling signal for stopping the laser diode from transmitting the bursts of data signals.

The optical echo signals are typically optical reflections and/or backscattering signals, derived either from the transmitted bursts of data signals (or at least from part of the transmitted bursts) or otherwise from signals other than the transmitted data burst signals (or from a part of those signals). For example, signals other than the transmitted bursts of data signals may be signals transmitted by another optical transmitter or transceiver in the network. The optical echo signals may also be optical reflections and/or backscattering signals derived from more than one other optical communication system in the network. The optical echo signals may also be a combination of optical reflections and/or backscattering signals from the data signals transmitted by the front-end circuit in the monitoring system under consideration and optical reflections and/or backscattering signals from signals transmitted by one or more other end-of-fiber terminals in the optical fiber network. The optical echo signals may arise from bursts of transmitted data signals or from part of such bursts.

The receiver means in the front-end circuit front-end may be arranged for receiving optical reflection and backscattering signals caused by signals transmitted by other optical transmitters in the network. The availability of this option depends on the particular structure of the optical fiber network. Preferably, the laser diode is adaptable for detecting the optical echo signals and arranged for supplying the detected signals to the receiver means.

Alternatively, the front-end circuit further includes a monitor photodiode arranged for controlling the laser diode. The monitor photodiode is further adaptable for detecting the optical echo signals and arranged for supplying the optical echo signals to the receiver means. The monitor photodiode is preferably integrated into the laser module.

In another example, the receiver means is arranged for converting the detected optical echo signals into electrical signals representative of the detected optical reflections and backscattering signals. Preferably, the driving circuit is a laser driver. In another example, the front-end circuit includes a data receiver for receiving data signals.

The present invention also relates to a fiber monitoring system comprising a front-end circuit as previously described. The fiber monitoring system further may include means for sampling and digitizing output signals from the receiver means arranged for receiving optical echo signals. Preferably, the fiber monitoring system further includes means for processing the digitized receiver means output signals. The means for processing optionally includes a delay bank for generating a plurality of delayed versions of the digitized received output signals and an adder for adding the plurality of delayed versions.

A further aspect the present invention relates to an end-of-fiber terminal in an optical fiber network comprising a fiber monitoring system as described. Another aspect the present invention relates to a method for deriving a signal indicative of distance-resolved optical fiber reflections and fiber attenuation from an optical fiber network. This method comprises: transmitting bursts of data signals over the optical fiber network; setting a disabling signal in an fiber monitoring system that includes a front-end circuit, as previously described, for disabling data signal transmission by the laser diode of the front-end circuit; detecting with the fiber monitoring system optical echo signals from the transmitted data signals and applying the detected optical echo signals to a receiver means of the front-end circuit, with the receiver means arranged for receiving optical echo signals; and deriving from the signals applied to the receiver means the signal indicative of the discrete optical reflections, optical backscattering, distance-resolved optical fiber reflections and/or fiber attenuation.

In an example, the same front-end circuit is also used for transmitting data signals. After transmitting the data signals, the laser diode is preferably reversed or zero-biased for performing the detection. Alternatively, the laser diode may be forward biased below a threshold current at which no lasing effect occurs. Alternatively a monitor photodiode is used for detecting when the laser diode has stopped transmitting. In an example, the laser diode is given a forward bias to act as an optical amplifier for amplifying the detected optical echo signals.

In another example, transmitting bursts of data signals is performed by at least one optical communication system in the optical fiber network different from the optical communication system used for detecting. Typically, the signal indicative of the distance-resolved optical fiber reflections and/or fiber attenuation corresponds to the response of the optical network when a step function is applied. Preferably, a negative step function is applied. Advantageously, the method further includes sampling and digitizing the signal indicative of the distance-resolved optical fiber reflections and/or fiber attenuation.

The method may further include correlating the signal indicative of the distance-resolved optical fiber reflections and fiber attenuation with at least a part of the transmitted burst of data signals. This correlation may also be used in a graceful degradation mechanism in order to improve the bit error rate on a section of the optical fiber network.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

The fiber monitoring system according to the present invention can be implemented in a end-of-fiber terminal that serves for communication on an optical network, both access and long-haul technologies, as long as it contains a suitable light source. A wide range of laser diodes with or without back facet photodiode, but also vertical sources such as VCSELs or even LEDs can be used for that purpose. As known in the art, an existing light source can be reused to convert optical echoes from transmitted data signals into electrical signals that can be further processed to derive the fiber channel properties. However, as these components are optimized to maximize the generated optical power, the responsivity is slightly lower when compared to dedicated optical to electric converters. Any kind of fiber endpoint, like an optical amplifier (OA), ONU, OLT, and so on, in any optical network can be equipped with a (sub)system to test the section of fiber that connects the endpoint to the optical network.

Figure 1:
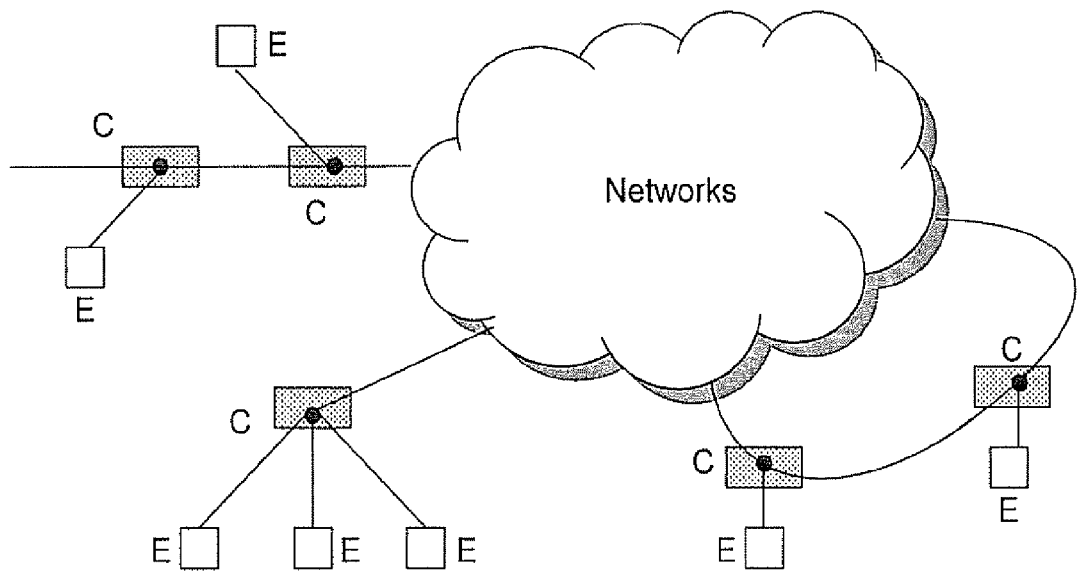
FIG. 1 is a block diagram representing the addition of embedded fiber monitors into fiber endpoints of an optical network that help monitoring the physical network layer.
Figure 2:
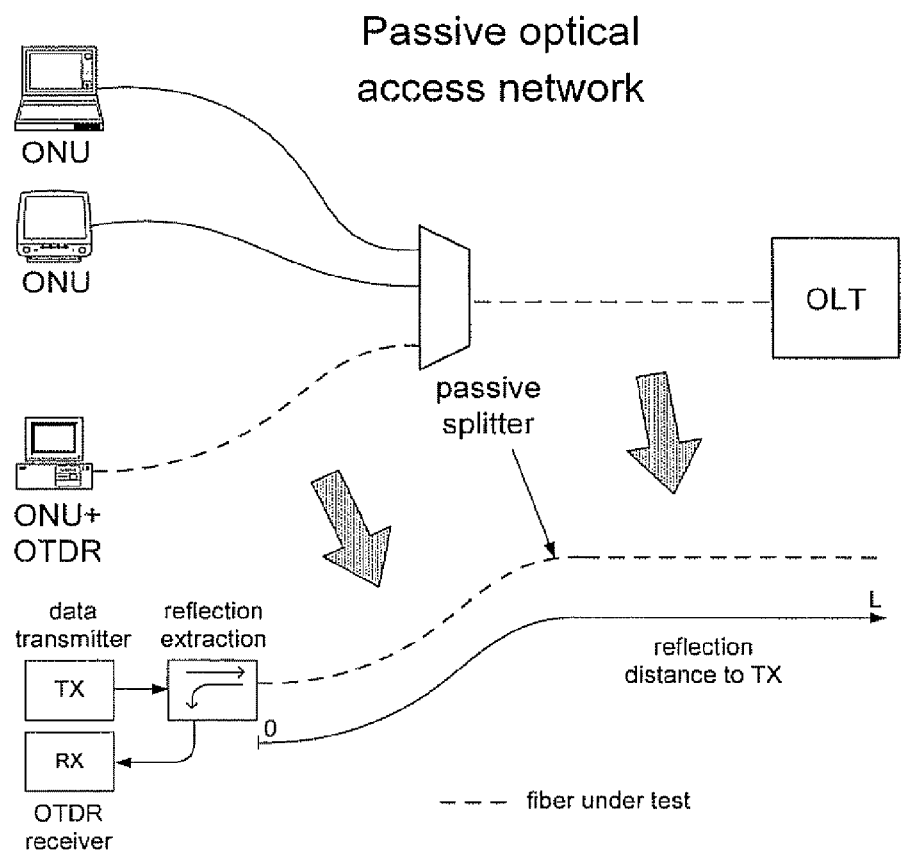
FIG. 2 is a block diagram representing a simplified architecture of a passive optical access network comprising an optical node unit (ONU) provided with an OTDR front-end.

FIG. 1 shows that the physical layer of every optical network can be monitored by equipping all its constituting fiber endpoints E and coupling points C with a fiber monitor that safeguards the fiber it is connected to. As an example, the inclusion of an embedded monitor in the ONU to monitor the drop section of a PON network is illustrated in FIG. 2. If every endpoint tests its connecting section(s), the complete network can be characterized, even with complex networks where the transmission medium is shared between a number of units.

Figure 3:
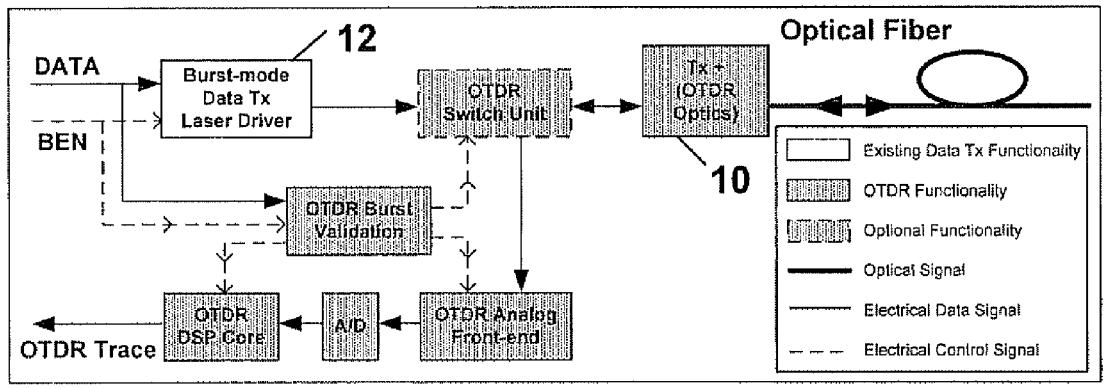
FIG. 3 is a block diagram representing a possible implementation of the front-end circuit as integrated with an optical transmitter.

FIG. 3 shows a block diagram of an example of one possible implementation of the burst-mode optical transmitter with embedded non-intrusive OTDR functionality. The Tx+OTDR optics is a laser module 10 consisting mainly of a laser diode with optionally a monitor photodiode, together with other optical or electro-optical components that may be required for detecting optical reflections. The laser driver 12 receives the data to be transmitted, together with a burst enable signal (BEN), from another physical layer device of the optical network such as a MAC (medium access control) chip. The OTDR Switch Unit (OSU) performs a fast switchover between a data transmission state and OTDR reception state. In normal operation, data transmission has priority and a fast switch-over towards OTDR reception is carried out after a burst transmission. By 'burst' is meant a limited amount of optical energy contained, at a given location, in a limited time window.

The OTDR Burst Validation (OBV) block plays a dual role. A first role is detecting suitable data bursts that can be used for non-intrusive OTDR testing. A second role is to act as a central control unit deciding whether the switchover between transmit mode and monitoring mode should take place mainly based on the burst enable signal BEN. The OTDR analog front-end (OAF) receives optical echo signals from the optical fiber network and converts the associated photo current, which represents fiber backscattering and/or reflections, into an analog electrical signal. Analog-to-Digital conversion (A/D) digitizes this analog signal for subsequent digital signal processing (DSP).

Exciting the fiber for OTDR purposes can be accomplished with a laser diode operated by the endpoint for data transmission, hence, using the same wavelength. This is one way to observe the fiber properties accurately, as they are wavelength dependent. The bandwidth of the transmitter (typically running at Gbps rates) is generally much larger than what is necessary for OTDR pulses. On the other hand, its excitation power is smaller than off-the-shelf OTDR units, resulting in weaker optical reflections and a decreased dynamic range for the receiver.

Figure 4:
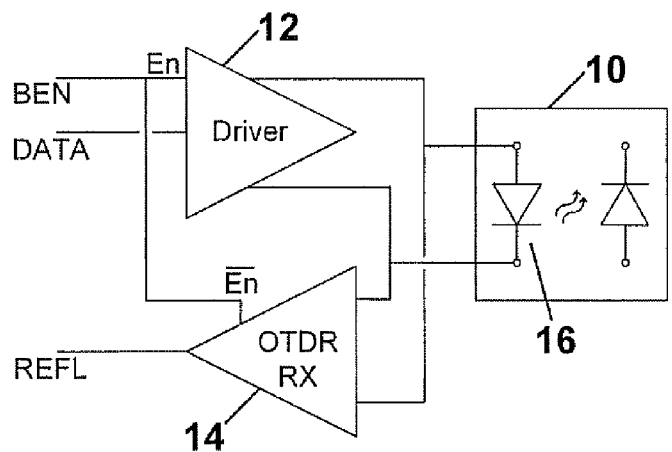
FIG. 4 is a diagram representing a front-end circuit according to an example of the invention.
Figure 5:
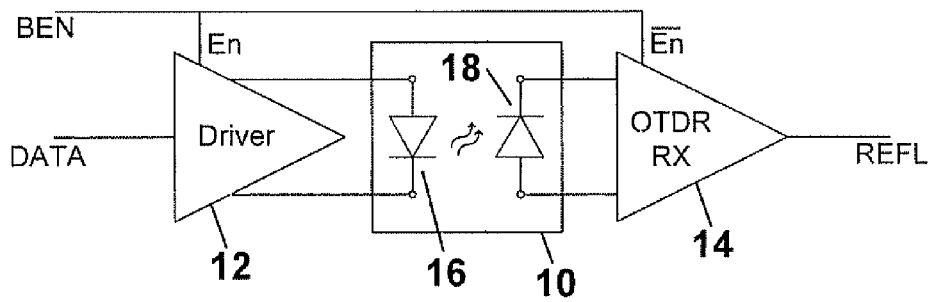
FIG. 5 is a diagram representing a front-end circuit according to an example of the invention.

FIG. 4 and FIG. 5 show examples of two circuits for measuring optical reflections according to the present invention. FIG. 4 shows a laser diode 16 to generate the optical excitation power. FIG. 4 also shows a laser driver 12 to drive the laser with data at an arbitrary speed and to accomplish a fast laser turn-off after the burst transmission. Further, FIG. 4 shows an optical receiver 14 able to convert the small photocurrent into a representative sample of the optical reflection.

By setting the burst enable signal (BEN) low, the laser driver output stages no longer drive the laser diode 16 above threshold, which stops the lasing. Lowering BEN also activates the receiver 14, which biases the laser diode 16 into a mode wherein it generates a photocurrent proportional to the optical echo signal. This photocurrent can be processed to derive the channel properties.

FIG. 5 illustrates a second approach in which a laser monitor photodiode 18 is used for echo acquisition. A laser-based optical transmitter or transceiver contains a semiconductor laser diode, driven by a laser driver chip or a circuit operating in burst-mode (e.g. TDMA PON) or continuous mode. A monitor photodiode with good ageing characteristics and low temperature dependency is optically coupled to the laser and generates a current proportional to the light emitted by the laser. This photodiode is normally exclusively used to control the laser operating point.

FIG. 5 shows the laser diode 16 that generates the optical excitation power, the laser-monitor photodiode 18, the laser driver 12 that drives the laser with arbitrary speed and the optical receiver 14 that converts the weak photocurrent into a representative sample of the optical echo signal. If the optical coupling is constructed in a correct way, the photodiode generates a photocurrent proportional to the optical back reflections when the laser diode has stopped transmitting when the burst enable (BEN) signal is set low. This signal can be processed subsequently to derive the channel properties.

As explained, by quickly reversing or zero-biasing the laser diode after data burst transmission by means of the BEN signal, the laser diode is put into a photoconductive or photovoltaic mode, respectively, and generates a current proportional to the reflected and backscattered light to be measured. An optical echo signal suitable for OTDR measurements can so be extracted electronically from both the laser diode and the monitor photodiode without any need to interrupt the optical link or to introduce extra optical or electro-optical components. Although the responsivity may be low (depending on the construction of the laser diode, the collimating lens system and the applied semiconductor materials), an echo signal of sufficient quality can be extracted from the laser chip for OTDR measurements.

In the case in which both laser diode 16 and monitor photodiode 18 are integrated in one optical laser module 10, it is feasible to perform OTDR measurements on the laser diode 16 and on the monitor photodiode 18 separately or simultaneously. The responsivity to optical reflections of zero-biased and reverse biased laser diode 16 can be stronger than that of the monitor photodiode, with a ratio depending on the physical structure of the optical laser module 10. On the other hand, the laser diode 16 needs to change its state from a forward bias of several mA to a photovoltaic or photoconductive mode wherein weak currents in the order of a nA caused by optical echoes need to be detected. The monitor photodiode 18 keeps its bias during the burst transmission and reflection measurement, so the switching transient is naturally smaller.

A combination of both methods can contribute to an enhanced characterization of the optical link. Moreover, using either the monitoring photodiode or the laser diode for monitoring can have a further disadvantage in that there is polarization dependency and in that the responsivity may depend on external factors such as temperature. Polarization dependency can be countered by a simultaneous use of the monitoring photodiode and the laser diode, each with appropriate biasing, and combining the signals from both. So the combination of reverse biased photodiode and zero or slightly reverse biased laser can reduce polarization dependency considerably. Temperature dependency of the responsivity can be compensated for electronically, as temperature can be measured by an integrated thermoster.

Figure 6:
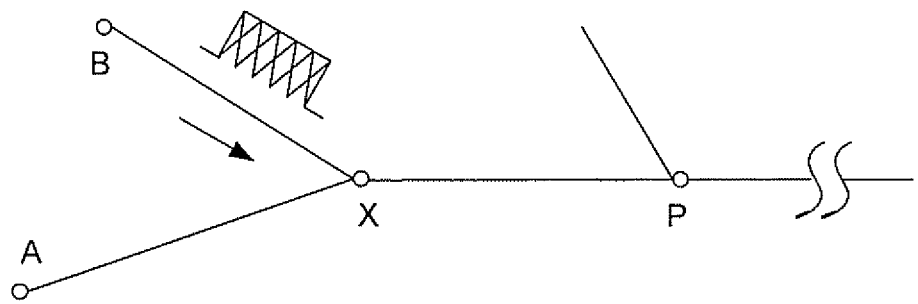
FIG. 6 is a diagram representing the detection of optical echo signals (at A) caused by another optical transmitter at B. The fibers join at the coupling point X and reflections between X and further coupling points P can be detected.

The received optical reflection and backscattering signals may be caused by signals transmitted either by the same optical transmitter (transceiver) or by one or more other optical transmitters (transceivers) in the network. FIG. 6 gives an illustration of the latter case. A receiver (A) can receive backscattering and Fresnel signals that are reflections of light transmitted by another laser transmitter (B) in the network. A and B can be placed at different locations. Different network topologies are possible. This allows A to obtain information on the state of the fiber section between X and P behind the point X where the fibers emerging from A and B are connected.

As an example, a simple 2-way coupler X is assumed to connect A and B to a common stretch of fiber X-P. When, on instant T, the trailing edge of the burst emitted by B and travelling to the right through junction point X (see FIG. 6) has passed the junction point X, backscattering of the section XP starts travelling back from node X towards A and B. An idle network transceiver in A can be placed in a mode capable of capturing this backscattered signal, and therefore can gather information on the section XP. Backscatter receiver A can be activated before the backscattering originated at X on moment T has reached A. As there is no switch-over delay for A, measurements can be performed very closely to point X. Light emitted by B into the coupler X that would directly propagate towards A by direct feedthrough in coupler X is not a problem, as this dies out with the aforementioned trailing edge of the burst emitted by B. So it stops before the arrival of the backscattering signal of interest and does not overlap with it in time.

The backscatter information on the fiber section X-P can be observed in a single or in multiple time windows, where it does not overlap with other signals reaching receiver A. A complete backscatter curve can be composed from different measurements taken in different time windows and can range from point X up to point P and even further, down to the noise floor of the signal processing in A. This method allows monitoring the state of the X-P fiber section (called common stretch where the fibers emerging from A and B are connected) between power splitters. This kind of common stretch cannot be easily monitored by an embedded OTDR at the OLT as stated in the already cited patent document EP-1624593-A.

The circuits shown in FIG. 4 and FIG. 5 allow for sampling the optical echo signal without an expensive additional optical coupler. However, the sensitivity is lower than with classic OTDR systems using a dedicated optical coupler and (avalanche) photodiode receiver. This means more measurements must be gathered and averaged to obtain the same signal-to-noise ratio. The present invention proposes a signal processing technique to convert reflections from pulses or data bursts with arbitrary length to a generalized format, enabling the processing of any optical reflection and backscattering into formatted echo information that can be averaged. This results in fast information acquisition and accurate measurements that do not put a load on the data traffic. As explained in more detail below, the generalized format is equal to the negative step response of the optical fiber system, which is the transient response from the fiber system after stopping exciting it with a peak power $P_0$.

Classic OTDR systems show an important trade-off between pulse width and measurement distance resolution. Any fiber network has a finite impulse response (FIR). Therefore, when exciting it with an optical pulse long enough for filling all fiber sections with light, shutting down the optical source and measuring the response, the backscatter reflection signal is maximized, while still maintaining the resolution obtained by excitation with very short pulses. This way the (negative) step response can be measured without any additional signal processing. This method maximizes the signal-to-noise ratio attainable with a combined reflection and backscattering measurement, while maintaining the distance resolution required for the exact localization of the cause of optical reflections.

The systems of FIG. 4 and FIG. 5 each can sample the optical echo signals emanating from inside the fiber by the presence of an optical signal. The test signal can be chosen arbitrarily. Injecting a pulse like classic OTDR instruments and measuring reflections is certainly possible, but such operation mode is intrusive and requires the network traffic to be suspended while transmitting and measuring. The invention presents a non-intrusive, passive solution, based on the circuits presented in FIG. 4 and FIG. 5, by measuring optical echo of data bursts sent by a network in normal operation.

This way no overhead is created upon the network and a non-intrusive system is obtained.

Figure 7:
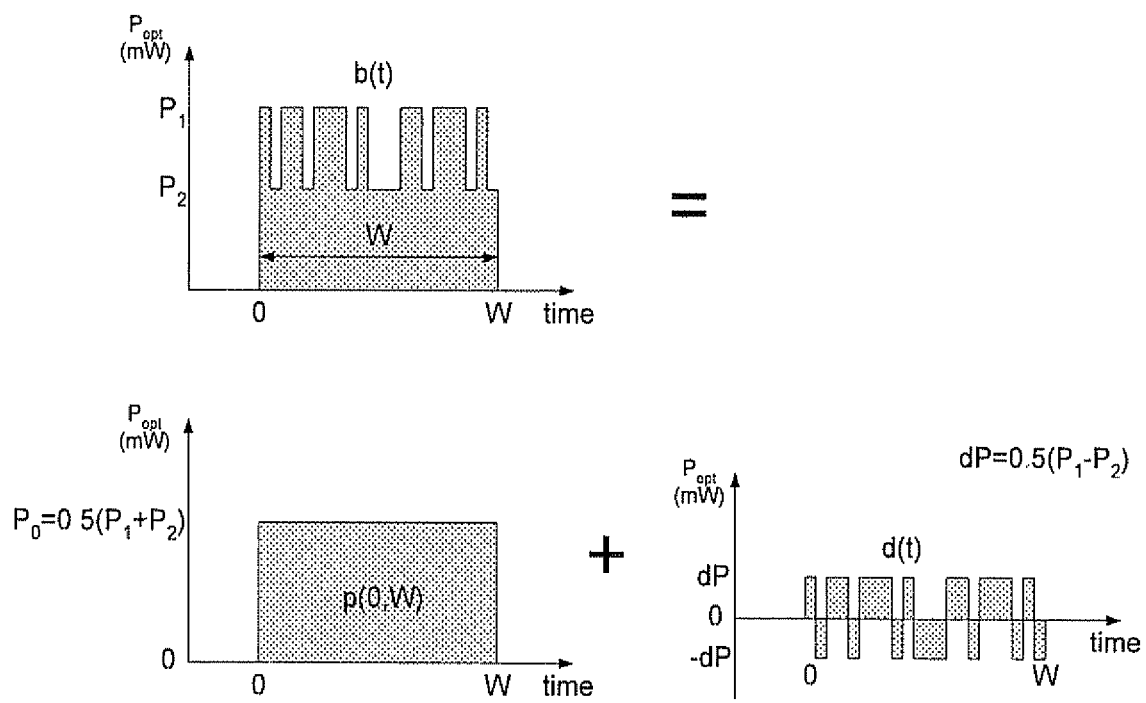
FIG. 7 is a series of graphs representing a dissection of a data burst transmit signal.

Of course, there is a difference between transmitting a data burst and sending a pulse with the same length. Bursts are in fact data modulated pulses. They can be rewritten as the sum of pulse p(t) and a zero-mean binary data signal d(t), both with width W. This is illustrated for non-return-to-zero (NRZ) bursts in FIG. 7, but the same applies to return-to-zero (RZ) bursts. Generally the data modulation bandwidth $f_b$ is much larger than the bandwidth B of the OTDR receiver. Under these circumstances it can be shown that a randomly modulated signal d(t) behaves like white noise within the OTDR receiver bandwidth, with a signal p(t) to modulation noise d(t) ratio that remains constant with time. In the case in which the receiver is a first order system, the optical SNR is proportional to $$SNR \sim \frac{P_1 + P_2}{P_1 - P_2} \sqrt{\frac{f_b}{B}}. \qquad (eq.\ 1)$$

In the case that the optical echo becomes very weak, the electrical receiver noise becomes dominant over the modulation noise. The formula is valid for the excitation signal and therefore also for the optical echo. Under the condition that the data signal d(t) does not behave like a randomly modulated signal (e.g., in the case of very short bursts or transmission of a lot of consecutive zeroes or ones), previous assumptions do not hold. This problem can be diagnosed since information in the transmitted data burst is known and therefore evolving echo measurements can be neglected. In conclusion, exciting the fiber plant with a regular data burst is similar to exciting with a pulse, at the expense of creating additional noise.

Any reflections caused by the transmitted data burst provide information about the reflections caused by the fiber plant. There is, however, a fundamental difference between burst reflections and the traditional approach. Classic OTDR units repetitively excite the fiber under test with a dedicated signal, such as a (strong) pulse with constant width W. In an operative network however, the length and content of the data bursts is controlled by OSI layers higher than the physical layer and is not controlled by the fiber monitoring system. Suppose two data bursts are transmitted with width W1 and W2, for with W1<W2. In the case in which the fiber impulse response is finite with duration L, only the last part of the transient with duration W1 of both transients is the same. Because many reflection measurements should be combined to obtain a decent accuracy, this methodology only allows characterization of a part of the fiber. Therefore, a method is needed to transform echo signals from data bursts with different width and content into a generalized format. In the following paragraphs a mathematical basis is given for the signal processing.

Figure 8:
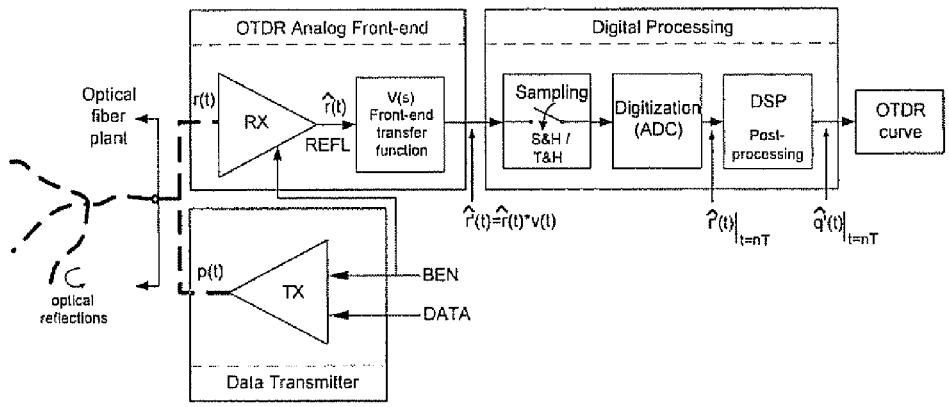
FIG. 8 is a block diagram representing a fiber monitoring system according to an example of the present invention.

The set-up of the fiber monitoring system is illustrated in FIG. 8. It includes an OTDR analog front-end containing a RX according to one of the embodiments of the invention presented in FIG. 4 or FIG. 5. These OTDR analog front-ends can optionally be improved with additional amplifying stages and filtering for mapping the echo dynamic range to the ADC and for removing excessive noise. The fiber monitoring system also includes a sample-and-hold or track-and-hold circuit that samples the analog signal. The system further includes an analog-to-digital converter (ADC) that digitizes the acquired sample. Signals in the time domain are further indicated with small letters, and their one-sided Laplace transform with capital letters. The digital signal processing that transforms the sample stream into an OTDR trace can be implemented on various platforms, like a digital signal processor, a microprocessor, a field-programmable gate array (FPGA), and so on. Abstraction is made of the modulation noise or other noise processes and only the response of the fiber system to the pulse is investigated.

Figure 9:
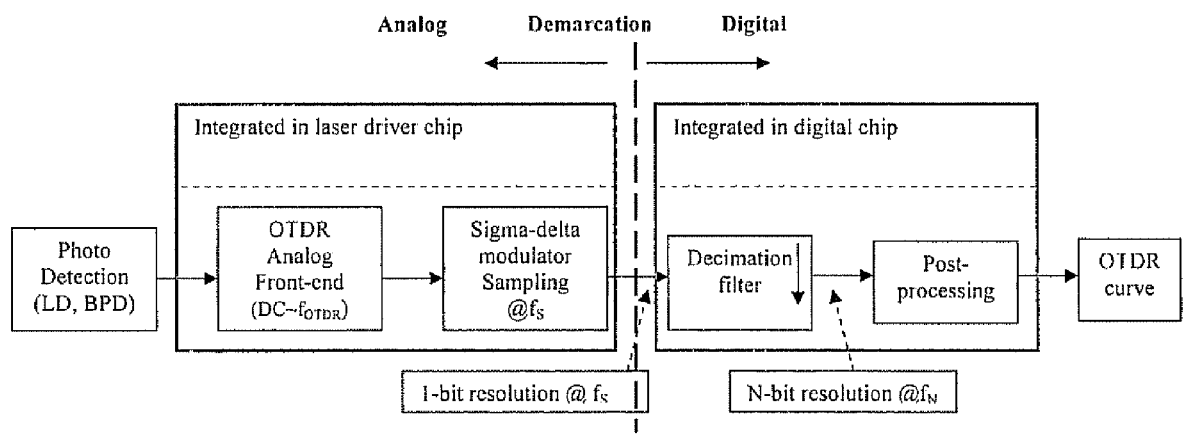
FIG. 9 is a block diagram representing an alternative implementation of the monitoring system according to an example of the invention.

An alternative approach for integrating the hardware into a laser transmitter may be based on an over-sampling technique (see FIG. 9). A sigma-delta modulator is integrated in the laser driver chip and is designed to sample the backscatter signal at a rate $f_S = f_N * OSR$, where OSR denotes the over-sampling factor and $f_N$ denotes the Nyquist rate. This can be a 1-bit sigma-delta modulator. This approach has many advantages. It has very low footprint on the laser driver chip. Another advantage is low substrate noise, as the sampling is performed when the laser driver chip is not transmitting. Further, another advantage is very low pin count. Only a single output pin required. Also, there is better performance due to very short connection with the signal line to be sampled and due to the higher supply voltage (currently 3.3V in laser driver chip but only 1.8/1.2V in a VLSI digital chip).

A digital decimation filter is implemented in the digital chip that feeds the data to the laser driver chip. This filter increases the sample resolution and reduces the sample rate down to the timing resolution required for fiber monitoring.

As an illustration, assume an ergodic fiber system under test with an impulse response f(t). The one-sided Laplace transform of the impulse response is denoted F(s). If the system is excited with an optical pulse p(t) with infinitely short rise and fall times, starting at t=0 with length W, power $P_0$, and Laplace transform P(s), the optical response R(s) becomes $$P(s) = P_0 \frac{1 - e^{-Ws}}{s} \qquad (eq.\ 2)$$

$$R(s) = F(s)P(s).$$

If the excitation pulse does have finite rise and fall times $T_e$, the excitation pulse can be rewritten as:

$$P(s) = P_0 \frac{1 - e^{-Ws}}{s} \frac{1 - e^{-T_e s}}{sT_e}. \qquad (eq.\ 3)$$

Evaluation in the frequency domain shows that if $T_e \ll W$, the effect of a finite $T_e$ on the pulse shape is minor. Therefore this effect is not taken into account.

The formula can be rewritten as $$\frac{F(s)}{s} = \frac{1}{P_0} \frac{R(s)}{1 - e^{-Ws}} = \frac{R(s)}{P_0} \sum_{k=0}^{+\infty} e^{-Wks}. \qquad (eq.\ 4)$$

With f(t) the impulse response of F(s), and u(t) the unit step and the operator * denoting a time domain convolution, the expression in eq. 4 can be reinterpreted as $$f(t) * u(t) = \frac{1}{P_0} \sum_{k=0}^{+\infty} r(t - kW). \qquad (eq.\ 5)$$

The unit step response from system F(s) equals the infinite sum of time-delayed versions of the measured pulse response. If the impulse response of the channel is time limited to $t_{ch}$, the infinite sum can be reduced to K−1 terms, where K equals the largest integer number that is smaller than the quotient of $t_{ch}$ and W.

For both systems described in FIG. 4 and FIG. 5, when the laser is activated, BEN is high and the receiver is not on. Otherwise, it would certainly be saturated. This means that the first part of the transient cannot be measured, and the detection current becomes:

$$\hat{r}(t) = \begin{cases} 0 \text{ for } 0 \le t \le W \\ R \cdot r(t) \text{ for } t > W \end{cases} \quad \text{(eq. 6)}$$

The constant R is the responsivity of the optical front-end. It can be proven that $$f(t) * u(t) = \lim_{t \to \infty}(f(t) * u(t)) - \frac{1}{R \cdot P_0} u(t) \sum_{k=-K}^{-1} \hat{r}(t - kW). \quad \text{(eq. 7)}$$

The first term on the right-hand side of this expression is an unknown constant multiplied with a unit step. By taking the derivative of both sides of the expression, one finds:

$$f(t) = -\frac{1}{R \cdot P_0} \frac{d}{dt} \left[ u(t) \sum_{k=-K}^{-1} \hat{r}(t - kW) \right]. \quad \text{(eq. 8)}$$

This proves that it is possible to derive the fiber impulse response f(t) from the partial pulse response. This is very helpful because f(t) reveals localized information about any section in the fiber. By deriving the step response to find the impulse response, the unknown constant is out of scope. Also, it can be shown that the sum $$q(t) = u(t) \sum_{k=-K}^{-1} \hat{r}(t - kW) \quad \text{(eq. 9)}$$

is proportional to the optical echo transient that emerges from the fiber after exciting it for a very long time with power $P_0$ and then suddenly turning off the power at time zero. This is called the negative step response q(t).

The electrical receiver also has a certain transmission characteristic V(s) (see FIG. 8), so this results in the measurement of a fiber response $$\frac{F'(s)}{s} = \frac{1}{R \cdot P_0} \frac{R(s)V(s)}{1 - e^{-Ws}} = \frac{R(s)V(s)}{R \cdot P_0} \sum_{k=0}^{+\infty} e^{-Wks} \quad \text{(eq. 10)}$$

$$\frac{F'(s)}{s} = \frac{R'(s)}{R \cdot P_0} \sum_{k=0}^{+\infty} e^{-Wks} \quad \text{(eq. 11)}$$

$$R'(s) = R(s)V(s). \quad \text{(eq. 12)}$$

The reconstructed impulse response, which is called f'(t) or the smoothed version of f(t), is the convolution of f(t) with the receiver impulse response v(t). Like the negative step response, the smoothed negative step response also is independent of the pulse width W, which allows that reflection measurements are performed by combining echo signals resulting from different pulse widths.

Similarly, Equation 9 can be rewritten as $$q'(t) = u(t) \sum_{k=-K}^{-1} \hat{r}'(t - kW). \quad \text{(eq. 13)}$$

Figure 10:
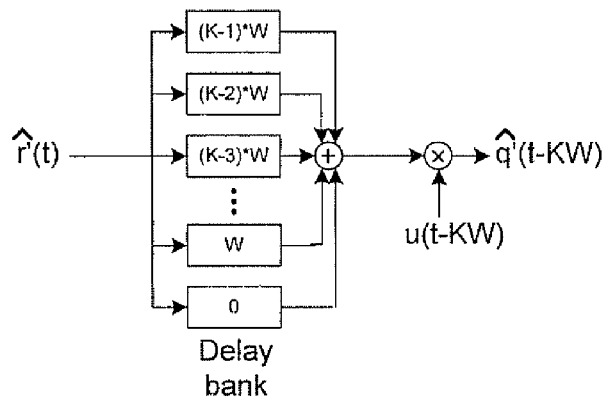
FIG. 10 is a diagram representing a delay bank for generating delayed versions of the receive signal.

The accent once again denotes the smoothed version of the fiber response r(t), and the circumflexed accent is used for indicating the version of the pulse response in which the part up to time W is missing. The practical implementation is illustrated in FIG. 10.

The previous derivation proves that the reflection of a burst coming from data traffic in an operative network can correctly be used as a means to characterize the optical fiber network, albeit at the expense of reduced signal power and additional modulation noise. This is, however, compensated by the fact that the system is able to measure any burst reflection and to derive useful information from it. Due to this non-intrusive operation, many measurements can be gathered quickly which compensates for the aforementioned drawbacks.

One special case of the presented method is when the fiber plant is excited with a pulse that is long enough to fill all fiber sections with light. Then the optical reflection power has converged to a constant value, and no delaying and summing needs to be done. The measured reflection directly equals the smoothed negative step response of the fiber network. This excitation mode maximizes the signal-to-noise ratio of the step response measurement, as the additional noise injected by the receiver is not multiplied by the delay-and-sum process. This method is very beneficial to characterize the properties of the fiber under test, as it maximizes the signal reflections while still maintaining good distance resolution.

In the optical receiver as shown in FIG. 8, the OTDR analog front-end has a fixed bandwidth B determined by the analog filtering process or the finite bandwidth of the amplifier stages. According to the Nyquist criterion, it is necessary to digitize with a sampling rate of at least two times B in order to be able to reconstruct the complete signal. For OTDR applications, typical values for B are in the MHz range, so appropriate ADC's should digitize at high speeds. The requirements for the dynamic range of the ADC are also very high, in order to be able to measure the weakest backscattering (Rayleigh scattering) reflections under presence of strong discrete reflections (Fresnel reflections). ADC's that fulfill both of these requirements are very power-consuming and expensive. Due to the signal processing method according to the invention, these requirements can considerably be relaxed.

Equation 13 demonstrates that the negative step response q(t) can be derived from the pulse response. Suppose one is interested in one point of this curve q($t_s$).

$$q'(t_s) = \hat{r}'(t_s+W) + \hat{r}'(t_s+2W) + \ldots + \hat{r}'(t_s+KW)$$

Figure 11:
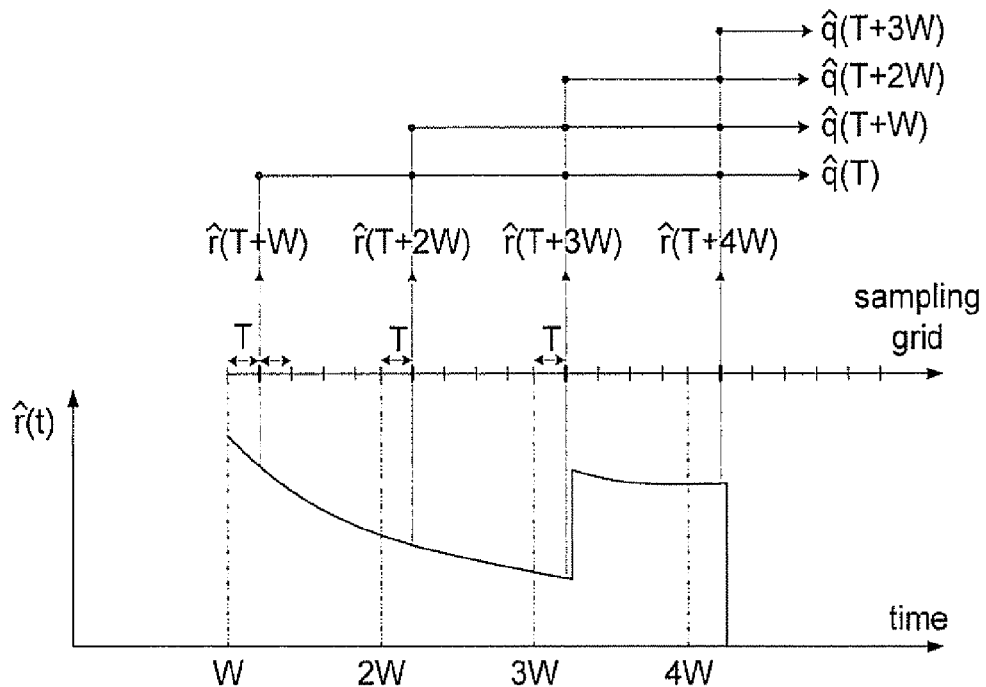
FIG. 11 is a graph representing the derivation of a step response from the pulse response.

By sampling the pulse response at times, samples being a distance W apart from each other, one sample of the negative step response can be reconstructed. Suppose W is a multiple of the sampling period T, even a number of samples from q(t) can be reconstructed from one single measurement (see FIG. 11). The requirements on the backend digital processing are relaxed, and the functionality consists merely of the summing of digitized samples only to reconstruct q'($t_s$). Of course, the drawback of this equivalent time sampling is that the acquisition time to gather a full OTDR curve is longer than with the direct full-bandwidth sampling technique, but it involves an elaborate trade-off between signal bandwidth and dynamic range. For low-cost fiber plant monitoring, equivalent time sampling can be performed in the background at a relatively low rate, without any interference with the normal operation of the network.

A critical issue on this approach is the generation of precise timing signals to convert the analog signal at the right moment. Digitizing at full speed and implementing delay-and-sum in the DSP block is an option. If the Nyquist criterion is obeyed and the reflection signal is converted at a sampling rate higher than two times B, the delaying process can be implemented digitally, by delaying the samples with a multiple of W and summing the correct signals, in agreement with Equation 9. If W is an integer multiple of T, the delay process is easily implemented by picking earlier samples. If this is not the case the delay can be implemented with a digital filter section that introduces the right amount of delay. Because the echo information stream is bursty, this process is not real-time, and can be implemented on many different DSP platforms.

FIG. 10 illustrates the principle of this approach, whereas the implementation is completely digital and all analog signals should be replaced with their digital equivalents. This operation mode is possible because one can gather every pulse reflection signal completely due to the high sampling speeds. Digitization using a fast sampling gate is another option. In this case, the sampling circuit and receiver from FIG. 8 or FIG. 9 is fast enough to acquire samples with a speed that is a multiple of the signal bandwidth, the echo receiver no longer only measures the average of the data burst, but is also able to distinguish the separate data bits from data modulated burst reflections. Because the system can have knowledge of the data burst that was transmitted, it is possible to correlate the complete transmitted burst or a part of it with the optical reflections. This significantly increases the signal to noise ratio of the measurement compared to the previously described technique which measured the averaged burst. The received echo depends on the transmitted code and can be scanned for sections that are best fit.

Figure 12:
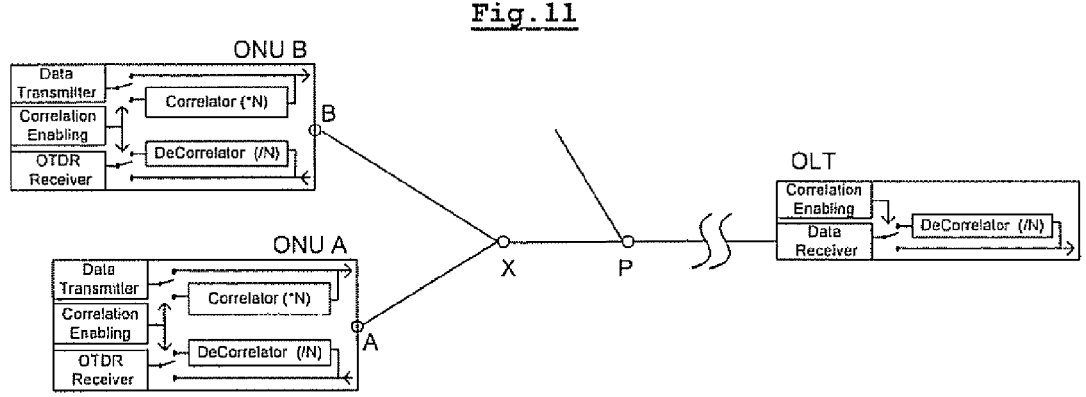
FIG. 12 is a block diagram representing a procedure for graceful degradation according to an example of the invention.

Data correlation can be used, not only for the accurate detection of reflective discrete optical events in the fiber thus increasing spatial resolution, but also for providing a mechanism for graceful degradation. When, at reception, the data from laser transmitter A (see FIG. 12) shows an increased bit error rate, up to the point that specific services might be threatened, the following acts can be performed:
  reduce the effective data rate transmitted by a factor N and transmit each data bit as an N-bit long pattern suitable for correlation;
  use correlation at the data receiver to improve the bit error rate;
  use correlation in the receiver located in A, or at another place B, to enhance the backscatter measurement so that the cause of the problem can be found;
  transmit the measured backscatter data using correlation, so the system can find out where the problem is located before all communication becomes impossible due to complete failure of the link; and
  repeat the previous steps up to the point where the bit error rate has recovered enough to sustain basic communication, so that more precise measurements can be triggered and results can be transmitted over the network or, in case of a major failure, the bit error rate has backed off to an extent that it can be concluded that all upstream communication has become impossible and the fiber is broken.

This procedure can deal with most damages to the fiber plant, which are usually preceded in time by minor fiber deterioration (e.g., caused by mechanical stress on the fiber). In the time span before a fatal damage, basic services can be kept alive, and valuable fiber monitoring information can be collected. For example, suppose the data stream is 1024 bits at 1.25 Gbps and define equal size of the correlation window (N=128). One can get eight correlation peaks, which occur at the same time slot in the correlation window with much higher SNR due to the correlation (spread-spectrum) gain. Then the eight peaks are averaged in order to get an even higher correlation peak, which can disclose the very small reflective optical events with short time compared with low-bandwidth OTDR approach.

The present invention has many advantages. For example, an optical echo signal, suitable for OTDR measurements, can be extracted electronically from both the laser diode or the monitor photodiode themselves without any need to interrupt the optical link or to introduce extra optical or electro-optical components. Additionally, the OTDR measurements can be performed passively without the need to inject specific OTDR signals into the network. In fact, the optical echoes caused by ongoing burst-mode data transmissions contain all information needed to perform OTDR measurements. The signal processing allows extracting valuable information such as the fiber attenuation as a function of distance, the location of abrupt changes in the fiber attenuation as caused by connectors, breaks, fiber joints, stress points and so on, and the strength and nature of such changes. A complete OTDR plot (fiber attenuation as a function of distance over kilometers of fiber length) can be generated by passively collecting a number of such echo signals in an operating optical fiber network without any interference with the ongoing data traffic, and without any penalty on the network performance. This is even possible when these echo signals result from data bursts with very different length and data content.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

We claim:

1. A fiber monitoring system for monitoring an optical fiber network, comprising:
  a front-end circuit, comprising:
    a burst validation block for identifying, within a plurality of bursts of data signals to be transmitted during normal operation of an optical fiber network, a set of bursts of data signals that are suitable for monitoring operation of the optical fiber network;
    a laser module comprising a laser diode configured to (i) transmit the plurality of bursts of data signals over the optical fiber network during normal operation of the optical fiber network and (ii) receive optical echo signals of the set of bursts of data signals that are suitable for monitoring operation of the optical fiber network;
    a driving circuit configured to (i) provide the bursts of data signals to the laser module and (ii) issue a disabling signal to stop the laser diode from transmitting the bursts of data signals and start the laser diode receiving the optical echo signals of the set of bursts of data signals that are suitable for monitoring operation of the optical fiber network; and
a receiver configured to receive the optical echo signals from the optical fiber network via the laser diode.

2. The fiber monitoring system of claim 1, further comprising circuitry configured to sample and digitize output signals received from the receiver so as to produce digitized output signals.

3. The fiber monitoring system of claim 2, further comprising circuitry configured to process the digitized output signals.

4. The fiber monitoring system of claim 3, wherein the circuitry configured to process the digitized output signals comprises:
a delay bank for generating a plurality of delayed versions of the digitized output signals; and
an adder for adding the plurality of delayed versions.

5. The fiber monitoring system of claim 1, wherein the fiber monitoring system is located in an end-of-fiber terminal in an optical network.

6. A front-end circuit for an optical communication system, comprising:
a burst validation block for identifying, within a plurality of bursts of data signals to be transmitted during normal operation of an optical fiber network, a set of bursts of data signals that are suitable for monitoring operation of the optical fiber network;
a laser module comprising a laser diode configured to (i) transmit the plurality of bursts of data signals over the optical fiber network during normal operation of the optical fiber network and (ii) receive optical echo signals of the set of bursts of data signals that are suitable for monitoring operation of the optical fiber network;
a driving circuit configured to (i) provide the bursts of data signals to the laser module and (ii) issue a disabling signal to stop the laser diode from transmitting the bursts of data signals and start the laser diode receiving the optical echo signals of the set of bursts of data signals that are suitable for monitoring operation of the optical fiber network; and
a receiver configured to receive the optical echo signals from the optical fiber network via the laser diode.

7. The front-end circuit of claim 6, wherein the laser module is further configured to switch between transmitting the bursts of data signals and detecting the optical echo signals.

8. The front-end circuit of claim 6, wherein the driving circuit is further configured to control the switching of the laser module.

9. The front-end circuit of claim 6, wherein the receiver is further configured to receive optical echo signals derivable from signals other than the transmitted bursts of data signals.

10. The front-end circuit of claim 6, wherein the receiver is further configured to convert the detected optical echo signals into electrical signals representative of the detected optical echo signals.

11. The front-end circuit of claim 6, further comprising a data receiver configured to receive data signals.

12. The front-end circuit of claim 6, wherein the optical echo signals comprise at least one of optical reflections and backscattering signals.

13. A method comprising:
a burst validation block identifying, within a plurality of bursts of data signals to be transmitted during normal operation of an optical fiber network, a set of bursts of data signals that are suitable for monitoring operation of the optical fiber network;
a laser module comprising a laser diode transmitting the plurality of bursts of data signals over the optical fiber network during normal operation of the optical fiber network;
the laser module detecting optical echo signals of the set of bursts of data signals that are suitable for monitoring operation of the optical fiber network;
a driving circuit (i) providing the bursts of data signals to the laser module and (ii) issuing a disabling signal to stop the laser diode from transmitting the bursts of data signals and start the laser diode detecting the optical echo signals of the set of bursts of data signals that are suitable for monitoring operation of the optical fiber network; and
a receiver receiving the optical echo signals from the optical fiber network via the laser diode.

14. The method of claim 13, further comprising switching between transmitting the bursts of data signals and detecting the optical echo signals.

15. The method of claim 13, wherein detecting optical echo signals of at least the set of bursts of data signals comprises detecting optical echo signals derivable from signals other than the set of bursts of data signals.

16. The method of claim 13, further comprising converting the detected optical echo signals into electrical signals representative of the detected optical echo signals.

17. The method of claim 16, wherein converting the detected optical signal into electrical signals comprises sampling and digitizing the detected optical echo signals to produce digitized output signals.

18. The method of claim 17, further comprising processing the digitized output signals.

19. The method of claim 18, wherein processing the digitized output signals comprises:
generating a plurality of delayed versions of the digitized output signals; and
adding the plurality of delayed versions.

20. The method of claim 13, wherein the optical echo signals comprise at least one of optical reflections and backscattering signals.

21. The method of claim 13, wherein the optical echo signals are indicative of distance-resolved optical fiber reflections and fiber attenuation.

22. The method of claim 13, wherein detecting the optical echo signals comprises detecting the optical echo signals using the laser diode, wherein the laser diode is reversed or zero-biased.

23. The method of claim 22, further comprising using the laser diode to amplify the detected optical echo signals.

24. The method of claim 13, wherein the laser module detecting the optical echo signals comprises the laser module detecting the optical echo signals using a photodiode.

25. The method of claim 13, further comprising correlating the detected optical echo signals with data signals in the set of bursts of data signals.

* * * * *